United States Patent
Tirloni et al.

(10) Patent No.: US 6,941,054 B2
(45) Date of Patent: Sep. 6, 2005

(54) OPTICAL TRANSMISSION LINK WITH LOW SLOPE, RAMAN AMPLIFIED FIBER

(75) Inventors: Bartolomeo Italo Tirloni, Bergamo (IT); Giacomo Stefano Roba, Monza (IT)

(73) Assignee: Pirelli S.p.A., Milan (IT)

( * ) Notice: Subject to any disclaimer, the term of this patent is extended or adjusted under 35 U.S.C. 154(b) by 198 days.

(21) Appl. No.: 10/362,662

(22) PCT Filed: Aug. 22, 2001

(86) PCT No.: PCT/EP01/09690

§ 371 (c)(1),
(2), (4) Date: Aug. 6, 2003

(87) PCT Pub. No.: WO02/19576

PCT Pub. Date: Mar. 7, 2002

(65) Prior Publication Data

US 2004/0028359 A1 Feb. 12, 2004

Related U.S. Application Data (60) Provisional application No. 60/230,796, filed on Sep. 7, 2000.

(30) Foreign Application Priority Data

Aug. 31, 2000 (EP) .............................................. 00118885

(51) Int. Cl.⁷ ................................................. G02B 6/02
(52) U.S. Cl. ............................ 385/127; 398/92; 398/97
(58) Field of Search ................................ 385/123–128; 398/68–73, 91–92, 97

(56) References Cited

U.S. PATENT DOCUMENTS

| 5,191,631 A | 3/1993 | Rosenberg |
| 5,553,185 A | 9/1996 | Antos et al. |
| 5,838,867 A | 11/1998 | Onishi et al. |
| 5,905,838 A | 5/1999 | Judy et al. |
| 6,751,389 B2 * | 6/2004 | Tirloni ........................ 385/127 |

FOREIGN PATENT DOCUMENTS

| EP | 0877496 A2 | 11/1998 |
| EP | 0935146 A2 | 8/1999 |
| EP | 0965866 A1 | 12/1999 |
| WO | WO/99/57822 | 11/1999 |
| WO | WO/99/66607 | 12/1999 |
| WO | WO 00/37977 | 6/2000 |

OTHER PUBLICATIONS

G. Grasso et al.; "Microbending Losses of Cabled Single Mode Fibres", ECOC '88, pp. 526–532, 1988.

G. Grasso et al.; "Microbending Effects in Single Mode Fibres", International Wire and Gable Symposium, pp. 722–731, 1988.

(Continued)

Primary Examiner—Akm Enayet Ullah
Assistant Examiner—Jerry T Rahll
(74) Attorney, Agent, or Firm—Finnegan, Henderson, Farabow, Garrett & Dunner, L.L.P.

(57) ABSTRACT

An optical fiber transmission link has a first optical fiber with a high effective area coupled to a second, downstream optical fiber with a low effective area. The downstream fiber has non-zero dispersion and low dispersion slope. Characteristics of the upstream fiber permit the launching of high power channels in a wavelength division multiplexing, and characteristics of the downstream fiber enable Raman amplification along that fiber to extend the transmission distance before a need for discrete amplification. The downstream fiber has a non-zero dispersion in the C-band wavelengths and a low dispersion slope and has low attenuation at the signal and pump wavelengths. Refractive-index profiles include variations of W-type fibers that may include outer rings of positive or negative index. Pumping of the downstream fiber may occur either co-directionally to the signals, counter-directionally to the signals, or in both directions.

20 Claims, 5 Drawing Sheets

OTHER PUBLICATIONS

Youichi Akasaka et al., "Enlargement of Effective Core Area On Dispersion–Flattern Fiber and its Low Nonlinearity", (Thursday Morning), OFC '98 Technical Digest, pp. 302–303 (1998).

Agrawal, "Stimulated Raman Scattering", Nonlinear Fiber Opics, $2^{nd}$ edition, pp. 316–369 (1995).

Fludger, Chris et al., "An Analysis of the Improvements in OSNR from Distributed Raman Amplifiers Using Modern Transmission Fibres", OFC2000, FF2-1, pp. 100–102 (2000).

Ping Wan et al., "Impact of Double Rayleigh Backscatter Noise on Digital and Analog Fiber Systems", Journal of Lightwave Technology, vol. 14, No. 3, pp. 288–297 (Mar. 1996).

Luc B. Jeunhomme, Single Mode fiber Optics, Basic Theory, Marcel Dekker Inc., pp. 32–38 § 1.3.2, (1990).

M. Nissov et al., "Rayleigh Crosstalk in Long Casades of Distributed Unsaturated Raman Amplifiers", Electronic Letters, vol. 35, No. 12, pp. 997–998, (Jun. 10, 1999).

P.B. Hansen et al., "Rayleigh Scattering Limitations in Distributed Raman Pre–Amplifiers", IEEE Photonics Technology Letters, vol. 10, No. 1, pp. 159–161, (Jan. 1998).

L.D. Garett, Field Demonstration of Distributed Raman Amplification with 3.8dB Q–improvement for 5×120km Transmission, OFC2000, pp. 293–295(2000).

* cited by examiner

OPTICAL TRANSMISSION LINK WITH LOW SLOPE, RAMAN AMPLIFIED FIBER

CROSS REFERENCE TO RELATED APPLICATIONS

This application is a national phase application based on PCT/EP01/09690, filed Aug. 22, 2001, the content of which is incorporated herein by reference, and claims the priority of European Patent Application No. 00118885.3, filed Aug. 31, 2000, the content of which is incorporated herein by reference, and claims the benefit of U.S. Provisional Application No. 60/230,796, filed Sep. 7, 2000, the content of which is incorporated herein by reference.

BACKGROUND OF THE INVENTION

1. Field of the Invention

The present invention relates generally to an optical fiber link that enables the transmission of dense wavelength-division-multiplexed optical signals across a wide band without significant degradation from non-linear effects, while also permitting Raman amplification within the link. More particularly, the present invention relates to an optical fiber having a low effective area, non-zero dispersion, and low dispersion slope for performing Raman amplification downstream from a fiber of high effective area.

2. Description of the Related Art

Optical transmission systems are continually being sought that will communicate wavelength-division-multiplexed signals over longer distances (several thousand kilometers) without amplification or regeneration, or with amplification or regeneration limited as far as possible, and will handle increased bandwidths. The current amplification band for optical systems is generally about 30 nm wide in the so-called C-band around 1550 nm, but developments are expanding this band to about 70 nm and including the so-called L-band of amplification around 1580 nm.

Non-linear optical effects are known to degrade the quality of transmission along standard transmission optical fiber in certain circumstances. These non-linear effects, which include four-wave mixing, self-phase modulation, Brillouin and Raman scattering, and cross-phase modulation, induce distortion into the transmitted signal in high-power systems, thereby degrading the quality of the transmission. In particular, the non-linear effects can hamper quality transmission using wavelength division multiplexing (WDM), which otherwise greatly enhances the signal carrying capability of optical transmission fibers by increasing the number of transmission channels through which signals may be sent.

These non-linear effects, particularly the phenomenon of four-wave mixing (FWM), can be minimized or avoided by using single-mode transmission fibers that have a large effective area and an absolute value of local dispersion that is greater than zero around the operating wavelengths. In advanced WDM systems, such as Dense Wavelength Division Multiplexing (DWDM) (spacing $\leq 0.8$ nm) and Hyper-Dense Wavelength Division Multiplexing (HDWDM) systems (spacing $\leq 0.4$ nm), where the transmission channels are closely packed together, the value of local dispersion must meet a minimum value to maintain the quality of the signals. On the other hand, if the dispersion value of the fiber becomes too large, the signals will become distorted during transmission unless dispersion correction devices are included in the transmission line. Thus, for an optical fiber to be effective in a WDM system, the fiber must have a minimum dispersion, but the value of dispersion must also be below a maximum value.

In general, increasing effective area and maintaining low loss and good macrobending/microbending loss behavior yield an increase in dispersion slope. As the bandwidth of WDM communications widens, however, a flat dispersion slope becomes increasingly more important to avoid dispersion variation between channels. In particular, the combination of high dispersion slope, wide WDM band, and long distance gives high differences of accumulated dispersion of the side wavelengths of the WDM band. Even in the presence of exact dispersion compensation at a particular position of the WDM band (e.g. the center channel), the channels set apart from that particular position (e.g. the side channels) will accumulate large amounts of chromatic dispersion. The interplay between dispersion and non-linear effects deteriorates these outlying signals in such a way that it prevents the receiver from recovering them, even in the presence of an optimal channel-by-channel pre-compensation at the transmitter side and/or post-compensation at the receiver side. Consequently, a low slope of dispersion across an operating bandwidth is important for effective transmission of WDM channels in both the C and L bands.

Fibers having low dispersion slope are known. For example, U.S. Pat. No. 5,553,185 to Antos et al. discloses a non-zero dispersion fiber that is characterized by a series of core regions that have different refractive-index profiles and widths. The shape of the refractive-index profiles, in terms of the refractive-index difference and the radius, of each region may be adjusted to have properties tailored for a high performance telecommunication system. In particular, one of the regions has a depressed refractive-index difference. The dispersion slope of the disclosed fiber is less than 0.05 ps/nm$^2$/km and the absolute value of the total dispersion is between 0.5 and 3.5 ps/nm/km over a pre-selected transmission range, which spans about 1490–1575 nm. In addition, the zero-dispersion wavelength is about 1593 nm, which is outside the pre-selected transmission range.

Another fiber for a high performance communication system is discussed in Y. Akasaka et al., Enlargement of Effective Core Area on Dispersion-Flattened Fiber and Its Low Non-Linearity, OFC '98 Technical Digest, pp. 302–304. This fiber is also characterized by a series of core regions having varying refractive-index differences and radii. One of the core regions also has a depressed refractive-index difference. The disclosed fiber has a dispersion slope lower than standard single-mode fiber over the transmission window.

Distributed Raman amplification in the transmission line may be used, e.g., to increase the transmission distance between erbium-doped amplifiers, and/or to reduce the span loss that would result from an increase in the number of WDM channels or a decrease in power and cost reduction of the erbium doped amplifiers. Stimulated Raman scattering is a nonlinear process that can cause an optical fiber to amplify an optical signal. The Raman scattering converts a small fraction of the incident power from a pump optical beam to another optical beam at a frequency downshifted by an amount determined by the vibrational modes of the medium. The usual configuration of distributed Raman amplifier uses the transmission line as the medium wherein a pump, which typically is counter-propagating, causes stimulated Raman scattering at the signal wavelength. Two "rate equations" govern the dynamic of the signal ($P_S$) and pump ($P_P$) powers in the optical fiber in the case of a counter-propagating pump:

$$\frac{dP_S}{dz} = \frac{g_R}{a_P}P_P P_S - \alpha_S P_S \quad (1)$$

$$\frac{dP_P}{dz} = \frac{\omega_P}{\omega_S}\frac{g_R}{a_S}P_P P_S + \alpha_P P_P \quad (2)$$

where $\alpha_S$ and $\alpha_P$ are the attenuation coefficients of the optical fiber at signal and pump wavelength respectively, $\omega_S$ and $\omega_P$ are optical frequencies of signal and pump wavelength respectively, $a_S$ and $a_P$ are the effective core areas of the optical fiber at signal and pump wavelength respectively and $g_R$ is the Raman-gain coefficient of the fiber material for a given couple of optical frequencies. See Agrawal, *Nonlinear Fiber Optics*, $2^{nd}$ edition, ch. 8 (1995).

In general, distributed Raman amplification operates in an unsaturated regime, wherein signal power levels are maintained well below pump power levels. Under this assumption, one can neglect pump depletion, i.e., the first term in the right hand side of (2). Thus Equations (1) and (2) can be easily solved to obtain the signal power:

$$P_S(L) = P_S(0)\exp\left[\frac{g_R}{a_P}P_P(L)L_{eff} - \alpha_S L\right] \quad (3)$$

where L is the length of the medium fiber, $P_S(0)$ is the input signal power, $P_P(L)$ is the input (counter-propagating) pump power at the opposite end of the fiber, and $L_{eff}$ is the effective interaction length at pump wavelength given by:

$$L_{eff} = \frac{1}{\alpha_P}[1 - \exp(-\alpha_P L)]. \quad (4)$$

A Raman amplifier is characterized in terms of (linear) amplifier gain or ON/OFF ratio, which is defined by the following:

$$G_A(L) = \frac{P_S(L)}{P_S(0)\exp(-\alpha_S L)} = \exp\left[\frac{g_R}{a_P}P_P(L)L_{eff}\right] \quad (5)$$

Typical values of $P_P(L)$ range from 100 mW up to 1000 mW and above. Moderate values of pump power are considered less than 500 mW.

From Equation (5), one can determine that an efficient fiber in terms of distributed Raman amplification has the following properties:

small effective area (less than 45 $\mu m^2$) at the pump wavelength (typically between about 1400 nm and 1510 nm, preferably between 1440 nm and 1490 nm) or equivalently a small mode field diameter at the pump wavelength; and long effective length at the pump wavelength, which is equivalent, for a fixed length L of the fiber medium, to a low loss $\alpha_P$ at the pump wavelength.

These observations are well in agreement with experimental results shown in the article Fludger et al., "An analysis of the improvements in OSNR from distributed Raman amplifiers using modern transmission fibres," *OFC2000*, FF2-1, pp. 100–102 (2000).

In the following, we will refer to an exemplary pump wavelength of about 1450 nm, but the invention contemplates the use of pump wavelengths from about 1350 nm to 1510 nm. In general, a fiber having small effective area at 1450 nm also exhibits a small effective area at the conventional transmission bands C and L. This requirement conflicts with the need for fiber with high effective area for avoiding non-linear effects in dense WDM communications.

Besides low effective area, it is well known that other important conditions must be taken into account to achieve acceptable Raman amplification. Most important are the double backscattering of the amplified signal and the single backscattering of the spontaneous emission of the pump signal, as explained in Nissov et al., "Rayleigh crosstalk in long cascades of distributed unsaturated Raman amplifiers," *Electronics Letters*, vol. 35, no 12, pp. 997–998 (Jun. 10, 1999); Wan et al., "Impact of Double Rayleigh Backscatter Noise on Digital and Analog Fiber Systems," *Journal of Lightwave Tech.*, vol. 14, no. 3, pp. 288–297 (March 1996); and Hansen et al., "Rayleigh Scattering Limitations in Distributed Raman Pre-Amplifiers," *IEEE Photonics Tech. Letters*, vol. 10, no. 1, pp. 159–161 (January 1998).

In general, when a system uses distributed Raman amplification, there is an optimal value of pump power above which the performance is degraded by detrimental effects due to single and double backscattering., as shown in Garrett et al., "Field demonstration of distributed Raman amplification with 3.8 dB Q-improvement for 5×120 km transmission," *OFC2000*, PD42–1 to PD42-3 (2000).

In conclusion, a fiber suitable for a system having distributed Raman amplification is characterized by:

small effective area at the pump wavelength, in order to have high Raman gain efficiency;

low loss at the pump wavelength, in order to increase the interaction length between pump and signal;

low loss at the signal wavelength, in accordance with Equation (3);

low back-scattering at the signal wavelength, in order to reduce noise; and single mode performance at the pump wavelength when in cable form, in order to confine pump power into the fiber core.

The fiber loss is the sum of different attenuation mechanisms (such as infra-red absorption, OH absorption, UV absorption), among which a major role at operating wavelength is played by Rayleigh scattering and other scattering mechanisms. Backscattering is the combination of an elastic scattering process along the fiber (typically, although not restrictively, Rayleigh backscattering) and the mechanism of recapture of light in the backward direction. In general, for common transmission fibers high loss implies high backscattering, because the dominant term of loss is the elastic scattering of the light.

A few publications address a combination of optical fibers in a transmission link that includes Raman amplification. WO99/57822, for example, discloses a unitary, dispersion-managed optical fiber that has a total dispersion that changes from positive to negative along the length of the fiber over a transmission wavelength range. The fiber may include distributed amplification by stimulated emission of a rare-earth dopant, Raman effects, or by both. An embodiment in WO99/57822 contemplates shorter sections of the unitary fiber having higher loss, especially when the shorter sections are co-doped with alumina and have a smaller effective area for better pump light/erbium overlap. In this embodiment, the longer sections would be designed to have lower loss and larger effective area. In a preferred embodiment, sections having negative dispersion also have negative dispersion slope. Applicants has observed that the latter generally causes high loss due to high fluorine dopant content.

WO99/66607 discloses an apparatus and method for combining optical amplification and dispersion compensation in a Raman amplifier. A device called a dispersion-managing Raman amplifier (DMRA) combines Raman amplification and has its length and dispersion selected to balance the dispersion of a link. Used as a dispersion compensator that aims to reduce total dispersion to zero, the DMRA has high negative dispersion and a low effective area, which enables Raman amplification.

U.S. Pat. No. 5,191,631 describes a hybrid optical fiber that has a desirable fiber dispersion characteristic and a relatively large effective area. Hybrid fibers are constructed by splicing together a fiber with a large effective area but typically unsatisfactory fiber dispersion characteristics to a fiber having excellent dispersion characteristics but a smaller effective area. The patent, however, does not contemplate having distributed Raman amplification across the second fiber, having a low dispersion slope in the second fiber, or obtaining a low slope of dispersion across the link for WDM applications.

Applicants have observed the need for an optical transmission link that permits the transmission of dense WDM channels across a wavelength band that includes the C-band, and may also include the L-band, without destructive FWM and that includes distributed amplification within the line.

SUMMARY OF THE INVENTION

Applicants have observed that an optical fiber link having a first non-zero dispersion optical fiber of a high effective area, coupled directly upstream from a second optical fiber having a low effective area, non-zero dispersion, and low absolute value of dispersion slope enables efficient Raman amplification across the downstream optical fiber and transmission of dense and hyper-dense WDM channels without significant four wave mixing and other detrimental non linear effects over a wide band.

Applicants have further observed that such an optical link can attain Raman amplification through pumping of the downstream fiber both co-directionally and counter-directionally to an optical signal without significant signal degradation from single or double backscattering.

In one aspect, an optical fiber transmission link consistent with the invention includes a first optical fiber having a first effective area at 1550 nm greater than about 45 $\mu m^2$, and a second fiber coupled downstream from the first optical fiber. The second fiber has a second effective area less than the first optical fiber, an absolute value of dispersion between about 2 and 20 ps/nm/km at 1550 nm, an absolute value of dispersion slope less than about 0.040 ps/nm$^2$/km at 1550 nm, and an attenuation coefficient at 1550 nm of less than about 0.24 dB/km and at 1450 nm of less than about 0.30 dB/km. In addition the fiber advantageously shows a cut off when in cable form smaller than or equal to about 1450 nm. The first optical fiber may be standard single-mode fiber, a non-zero positive dispersion fiber, or a non-zero negative dispersion fiber.

Preferably, the dispersion of the second optical fiber at 1550 nm is between about −2 and −20 ps/km/nm, more preferably between about −3 and −8 ps/km/nm. Preferably, the dispersion of the second optical fiber at 1625 nm is less than or equal to about −0.1 ps/km/nm. Preferably, the absolute value of dispersion slope of the second optical fiber at 1550 nm is less than about 0.035 ps/nm$^2$/km, more preferably less that about 0.030 ps/nm$^2$/km.

Preferably, the mode field diameter (MFD) of the second optical fiber at 1550 is less than 7.6 $\mu m$, more preferably less than 7.4 $\mu m$, even more preferably less than 7.2 $\mu m$.

Preferably, the cable cut off wavelength of the second fiber (ITU-T G650 Rec.) is between about 1250 nm and 1450 nm Preferably, the macrobending attenuation of the second fiber for one loop over a 32 mm mandrel is less than about 0.5 dB at 1550 nm and less than about 1.0 dB at 1625 nm. More preferably, the macrobending attenuation is less than about 0.2 dB at 1550 nm and less than about 0.5 dB at 1625 nm.

Preferably the second fiber has a microbending sensitivity less than about 8 (dB/km)/(g/mm) at 1550 nm and less than about 12 (dB/km)/(g/mm) at 1625 nm. More preferably, the microbending sensitivity at 1550 nm is less than about 6 (dB/km)/(g/mm) at 1550 nm and less than about 10 (dB/km)/(g/mm) at 1625 nm.

Advantageously, the effective area at 1550 nm of the second fiber is less than about 45 $\mu m^2$.

Preferably the second fiber has one and only one zero dispersion wavelength between 1200 and 2000 nm.

In a second aspect, a method for transmitting a plurality of wavelength division multiplexed optical signals across a long distance consistent with the present invention comprises: transmitting the optical signals along a first optical fiber having a first effective area greater than about 45 $\mu m^2$; transmitting the signals along a second fiber having a second effective area less than the first optical fiber, an absolute value of dispersion between about 2 and 20 ps/nm/km at 1550 nm, an absolute value of dispersion slope less than about 0.040 ps/nm$^2$/km at 1550 nm and an attenuation coefficient at 1550 nm of less than about 0.24 dB/km and at 1450 nm of less than about 0.30 dB/km; and coupling a pump light into the second fiber so as to provide distributed Raman amplification of the optical signals.

In a third aspect, an optical fiber for improved Raman amplification and transmission of wavelengths including the C-band consistent with the present invention includes a glass core and a glass cladding. The glass core has an inner core with a first refractive-index difference $\Delta n_1$ of between about 0.008 and 0.014, a first layer radially surrounding the inner core along the length of the fiber and having a second refractive-index difference $\Delta n_2$ of between about −0.0005 and −0.0030. The fiber may have a second layer radially surrounding the first layer along the length of the fiber with a third refractive-index difference $\Delta n_3$ greater than 0. Moreover, the fiber may have a third layer radially surrounding the second layer along the length of the fiber with a fourth refractive-index difference $\Delta n_4$ not greater than 0. The glass cladding surrounding the glass core has a refractive-index difference $\Delta n_{CL}$ substantially equal to 0.

The optical fiber according to the third aspect of the invention has a mode field diameter at 1550 nm of less than about 7.6 $\mu m$, an attenuation coefficient at 1550 nm of less than about 0.24 dB/km and at 1450 nm of less than about 0.30 dB/km, absolute value of dispersion at 1550 nm between about 2 and 20 ps/nm/km, and absolute value of dispersion slope at 1550 nm of less than about 0.040 ps/nm$^2$/km.

Preferably, $\Delta n_1$ of the optical fiber is between about 0.009 and 0.012, $\Delta n_2$ is between about −0.0010 and −0.0025, and $\Delta n_3$ is between about 0 and 0.006. Preferably, the mode field diameter is less than about 7.4 $\mu m$ at 1550 nm and less than about 6.8 $\mu m$ at 1450 nm. More preferably, the mode field diameter is less than about 7.2 $\mu m$ at 1550 nm and less than about 6.6 $\mu m$ at 1450 nm.

Preferably, the optical fiber has an absolute value of dispersion slope at 1550 nm of less than about 0.035 ps/nm$^2$/km, more preferably less than about 0.030 ps/nm$^2$/km.

Preferably the optical fiber has one and only one zero dispersion wavelength between 1200 and 2000 nm.

In a fourth aspect, an optical fiber preform for drawing an optical fiber for improved Raman amplification and transmission of wavelengths including the C-band comprises a glass core including an inner core having a first width and a first refractive-index difference $\Delta n_1$ between about 0.008 and 0.014 and a first layer radially surrounding the inner core along the length of the fiber and having a second width and a second refractive-index difference $\Delta n_2$ of between about −0.0005 and −0.0030. The preform further comprises a glass cladding surrounding the glass core and having a third width and a refractive-index difference $\Delta n_{CL}$ substantially equal to 0. The core is selected so that the drawn fiber has a mode field diameter at 1550 nm of less than about 7.6 µm, an attenuation coefficient at 1550 nm of less than about 0.24 dB/km and at 1450 nm of less than about 0.30 dB/km, absolute value of dispersion at 1550 nm between about 2 and 20 ps/nm/km, and absolute value of dispersion slope at 1550 nm of less than about 0.040 ps/nm²/km.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

DETAILED DESCRIPTION OF THE PREFERRED EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

Throughout the present description reference is made to refractive-index profiles of optical fibers. The refractive index profiles comprise various radially arranged sections. Reference is made in the present description or shown in the figures as precise geometrical shapes for these sections, such as step or gaussian-like. It is evident that the refractive-index profiles achieved in practice may differ from the above, idealized profiles. It has been shown in the literature, however, that these differences do not change the fiber characteristics if they are kept under control.

In general, a refractive-index profile section (or segment) has an associated equivalent refractive-index profile section that is different in shape and dimensions. An equivalent refractive-index profile or profile section may be substituted for its associated refractive index profile or profile section without altering the waveguide performance. For example, see "Single Mode Fiber Optics," Luc B. Jeunhomme, Marcel Dekker Inc., 1990, page 32, section 1.3.2. It will be understood that disclosing and claiming a particular refractive-index profile shape and dimensions includes the associated equivalents in the disclosure and claims.

Figure 1:
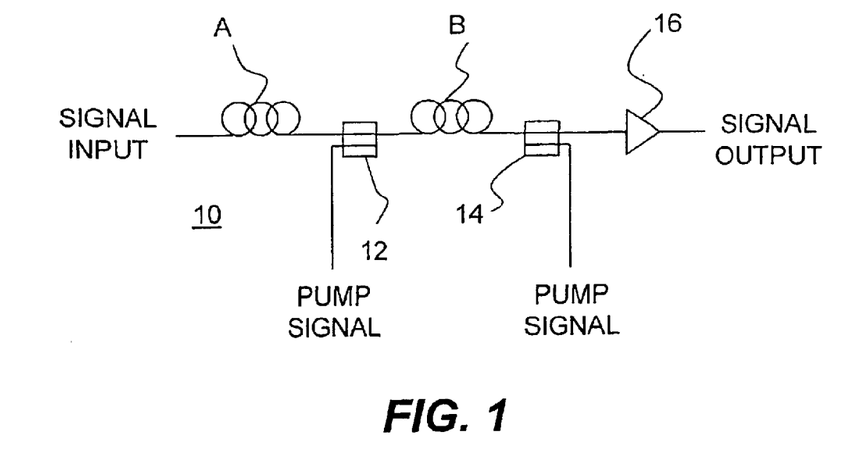
FIG. 1 is schematic diagram of an optical transmission link according to the present invention.

In accordance with the principles of the present invention, and as generally referenced as 10 in FIG. 1, an optical fiber transmission link comprises a first single-mode optical fiber A and a second single-mode optical fiber B. Both fibers A and B are preferably glass optical fibers capable of carrying optical signals individually or by wavelength division multiplexing across long distances with low attenuation. At the left of fiber A in FIG. 1, a signal is received and fed into the fiber for transmission downstream to a signal output at the end of the link. The signal input may be derived directly from a transmitter or from other parts (not shown) of an optical transmission system upstream from link 10, such as an add/drop multiplexer, dispersion compensating unit, optical amplifier, or the like. Likewise, the signal output downstream from link 10 may feed directly into a receiver or other parts (not shown) of an optical transmission system, such as an add/drop multiplexer, dispersion compensating unit, or the like.

Transmission link 10 may include couplers such as 12 and 14 for adding pump light into fiber B. Pump signals may be derived from one or more pump sources (not shown) such as laser diodes. The pump light from a source is fed through coupler 12 into fiber B to pass co-directionally with signal light passing along fiber link 10. Additionally or alternatively, the same or a different pump signal may be fed through coupler 14 into fiber B to pass counter-directionally with signal light passing along fiber link 10. Preferably, couplers 12 and 14 are conventional dichroic couplers.

The present invention contemplates the arrangement of link 10 into a hybrid configuration where first span A is made of optical fiber having a relatively large effective area and second span B is made of optical fiber having a smaller effective area, low absolute value of dispersion slope, and low attenuation. The characteristic lower effective area and low attenuation applies for span B both at the signal wavelength at least within the C band and at the pump wavelength, which is typically about 1450 nm. As opposed to dispersion-flattened optical fibers, the second span fiber B has zero dispersion at only one wavelength across the wavelength band of about 1200–2000 nm.

Based on these characteristics, Fiber B is configured to provide distributed Raman amplification to the optical signals in the link due to pump signals injected through one or both of couplers 12 and 14. Discrete signal amplification via a dedicated local device such as an erbium-doped fiber amplifier 16 is separated from the region of coupling of fibers A and B so that the power of an optical signal launched into fiber B is substantially less than the power at the input of fiber A due to attenuation of the signal as it passes up to the point of the input of fiber B. Typically, the power of an optical signal launched into fiber B is not significantly different from the power of the optical signal that emanates from fiber A.

Large effective area fiber is known to provide favorable four-wave-mixing and non-linear effects performance for WDM channels. In the context of the present invention, large effective area is considered to be greater than about 45 $\mu m^2$ at 1550 nm (i.e., a mode field diameter of greater than about 7.7 $\mu m$). Consequently, fiber A enables the transmission of dense WDM channels with relatively high signal power. Preferably, fiber A has optical characteristics including local non-zero dispersion, preferably less than −0.1 ps/nm/km at 1625 nm, a relatively flat dispersion slope across the operating bandwidths 1530–1625, large effective area, preferably between about 45 $\mu m^2$ and 90 $\mu m^2$ at 1550 nm, low total optical loss, and a low fluorine content (to enhance the industrial control of optical properties and to reduce loss and splice loss). Fiber A typically has a length such that an optical signal traveling through it is attenuated from its input power and in need of some amplification.

Table 1 shows a listing of the optical characteristics for exemplary fibers A1–A10 that could be used in a link alone or as first span fibers A in a hybrid configuration, as described in more detail below. Throughout the present description fiber characteristics are referred to a wavelength of 1550 nm if not otherwise specified. Fibers A1–A9 are conventional, as further discussed in the following, fiber A10 will be described in detail below.

TABLE 1

| First Span Fiber | Dispersion (ps/nm-km) | Dispersion Slope (ps/nm²-km) | Effective Area at 1450 nm ($\mu m^2$) | Effective Area ($\mu m^2$) | Attenuation (dB/km) |
|---|---|---|---|---|---|
| A1 | 17 | 0.06 | 74 | 80 | 0.19 |
| A2 | 4.1 | 0.08 | 58 | 70 | 0.20 |
| A3 | 4.5 | 0.05 | 47 | 55 | 0.20 |
| A4 | 8.0 | 0.06 | 56 | 65 | 0.20 |
| A5 | −3.1 | 0.07 | 45 | 55 | 0.20 |
| A6 | −3.5 | 0.11 | 53 | 70 | 0.21 |
| A7 | −3.0 | 0.05 | 44 | 50 | 0.21 |
| A8 | −3.2 | 0.08 | 53 | 68 | 0.21 |
| A9 | −3.5 | 0.05 | 44 | 50 | 0.21 |
| A10 | −4.5 | 0.045 | 43 | 50 | 0.21 |

Each of these examples for fiber A has an effective area in excess of 45 $\mu m^2$ with low attenuation, making them desirable for transmitting higher power WDM signals (e.g., in the order of between about −10 dBm and +10 dBm per channel).

A large effective area, however, is detrimental to efficient Raman amplification. Fiber span B has an effective area lower than that of span A (preferably less than or equal to about 45 $\mu m^2$) to enable efficient Raman amplification of the optical signals. Span B is designed to enable, if desired, counter-directional and co-directional pumping via couplers 12 and 14 at a Raman pump wavelength of between about 1400 and 1500, preferably between about 1450 nm and 1490 nm.

In a preferred embodiment, second span fiber B has optical characteristics that permit both Raman amplification and efficient transmittal of WDM channels. Particularly, Applicants have found that fiber B should have a mode field diameter of less than 7.6 $\mu m$ at 1550 nm and less than 7.0 $\mu m$ at 1450 nm (preferably less than 7.4 $\mu m$ at 1550 nm and less than 6.8 $\mu m$ at 1450 nm), an absolute value of dispersion between about 2 and 20 ps/nm/km at 1550 nm (preferably a dispersion of between about −3 and −8 ps/nm/km at 1550 nm and less than −0.1 ps/km/nm at 1625 nm), and an absolute value of dispersion slope less than about 0.040 ps/nm²/km at 1550 nm (preferably less than about 0.035 ps/nm²/km, more preferably less than about 0.030 ps/nm²/km). Fiber B also has an attenuation coefficient at 1550 nm of less than about 0.24 dB/km and at 1450 nm of less than about 0.30 dB/km. Macrobending attenuation measured for 1 loop over a 32 mm mandrel is less than about 0.5 dB at 1550 nm (preferably less than about 0.2 dB) and less than about 1.0 dB at 1625 nm (preferably less than about 0.5 dB). Microbending sensitivity is less than about 8 (dB/km)/(g/mm) at 1550 nm (preferably less than 6 (dB/km)/(g/mm)) and less than about 12 (dB/km)/(g/mm) at 1625 nm (preferably less than 10 (dB/km)/(g/mm)).

To achieve the advantages of the invention, fiber A does not need to have an especially low slope itself. The use of fiber B, which has a low dispersion slope, with fiber A will lower the slope of the overall fiber link. Preferably, though, fiber A also has a relatively low slope. In particular, the preferred slope of dispersion for fiber A is about 0.05 ps/nm²/km or less.

Figure 2:
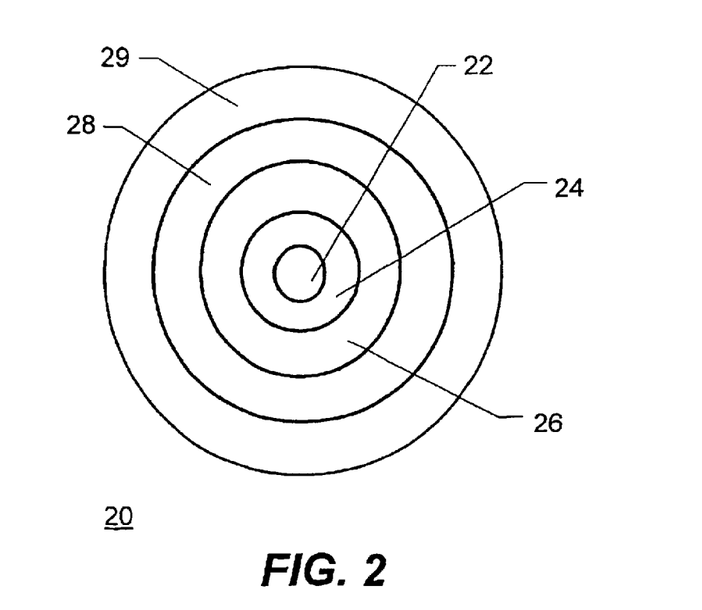
FIG. 2 is a cross-section of a downstream optical fiber having a low effective area according to the present invention.

A cross-section (not to scale) of optical fiber B according to a preferred embodiment of the present invention is schematically illustrated in FIG. 2 and is generally designated by the reference number 20. In accordance with the present invention, an optical transmission fiber for use in a WDM transmission system includes a glass core with an inner core having a first refractive-index difference $\Delta n_1$, higher than a refractive index of an outer cladding of substantially pure silica glass, and a first layer radially surrounding the inner core along the length of the fiber and having a second refractive-index difference $\Delta n_2$, lower than a refractive index of an outer cladding of substantially pure silica glass. The fiber core may have a second layer radially surrounding the first layer along the length of the fiber with a third refractive-index difference $\Delta n_3$ greater than 0. Moreover, the fiber core may have a third layer radially surrounding the second layer along the length of the fiber with a fourth refractive-index difference $\Delta n_4$ lower than 0. The glass cladding surrounds the glass core and has a refractive-index difference $\Delta n_{CL}$ substantially equal to zero.

Optical fiber 20 includes a core with a plurality of light conducting layers of glass and a cladding. The axial center of fiber 20 is inner core 22, which is made of doped glass. Inner core 22 has a first refractive-index difference $\Delta n_1$ and a radius $r_1$. The refractive-index difference refers to the difference in refractive index between a given layer of glass and the cladding glass. That is, for example, the refractive-index difference $\Delta n_1$ of inner core 22 equals $n_1 - n_{CL}$. First refractive-index difference $\Delta n_1$ of inner core 22 is between about 0.008 and 0.014, preferably between about 0.009 and 0.012. Preferably, inner core 22 is made of $SiO_2$ doped with a substance that increases the refractive index of pure $SiO_2$, such as $GeO_2$. Inner core 22 may include a central dip generated during the manufacturing process.

A first glass layer 24 radially surrounds inner core 22 along the length of fiber 20. First glass layer 24 extends from the outer radius $r_1$ of the inner core to a radius $r_2$ and has a decreased index of refraction $\Delta n_2$ across its width compared with region 22. The index of refraction $\Delta n_2$ of first glass layer 24 is depressed. A depressed index of refraction exists when the index of refraction of a given glass layer is less than the refractive index of the cladding layer, i.e. $\Delta n_2$ is less than 0. Second refractive-index difference $\Delta n_2$ of first glass layer 24 is between about −0.0005 and −0.0030. As is well known in the art, the depressed index is lower due to the addition of dopants in region 24 such as fluorine.

A second glass layer 26 may radially surround first glass layer 24 along the length of fiber 20. Second glass layer 26 extends from the outer radius $r_2$ of the first glass layer to a radius $r_3$ and has an index of refraction $\Delta n_3$, within its width, greater than 0 and lower than 0.006. Preferably, second glass layer 26 is made of $SiO_2$, doped with a substance that increases the refractive index of pure $SiO_2$, such as $GeO_2$.

An understanding of the advantages of the present invention can be achieved through a comparison between various types of optical links. Table 2 lists optical characteristics of different fibers. With the exception of prior art fibers B1, B5 and B6, the fibers of table 2 are exemplary fibers B for exploring the advantages of the present invention when coupled downstream from fibers A of Table 1. Invention fibers B2–B4 and B7–B12 have varying levels of effective area less than or equal to 40 $\mu m^2$, low attenuation and scattering, non-zero dispersion at 1550 nm, and low absolute value of dispersion slope.

TABLE 2

| Second Span Fiber | Dispersion (ps/nm-km) | Dispersion Slope (ps/nm²-km) | E.A. ($\mu m^2$) [1450 nm] | E.A. ($\mu m^2$) [1550 nm] | Attenuation (dB/km) [1450 nm] | Attenuation (dB/km) [1550 nm] |
|---|---|---|---|---|---|---|
| B1 (prior art) | −17 | −0.06 | 20–30 | 25–35 | >0.30* | 0.24* |
| B2 | 4 | 0.03 | 35 | 40 | 0.28* | 0.21* |
| B3 | −18 | 0.02 | 28 | 35 | 0.30* | 0.23* |
| B4 | −8 | 0.02 | 29 | 35 | 0.29* | 0.22* |
| B5 (prior art) | −3.1 | 0.07 | 45 | 55 | 0.28 | 0.21 |
| B6 (prior art) | −3.0 | 0.05 | 44 | 50 | 0.28 | 0.21 |
| B7 | −3.2 | 0.03 | 34 | 40 | 0.28* | 0.21* |
| B8 | −3.5 | 0.03 | 34 | 40 | 0.28* | 0.21* |
| B9 | −3.5 | 0.03 | 30 | 35 | 0.28* | 0.21* |
| B10 | −3.5 | 0.02 | 34 | 40 | 0.28* | 0.21* |
| B11 | −3.5 | 0.02 | 30 | 35 | 0.28* | 0.21* |
| B12 | −4.2 | 0.02 | 30 | 35 | 0.28* | 0.21* |

A third glass layer 28 may radially surround second glass layer 26 along the length of fiber 20. If used, third glass layer 28 extends from the outer radius $r_3$ of second glass layer 26 to an outer radius $r_4$, and has a negative minimum refractive index $\Delta n_4$. As described below, a preferred embodiment of the present invention has a refractive index $\Delta n_4$ for third layer 28 that is greater than $\Delta n_2$.

Finally, a light conducting cladding 29 surrounds the core in a conventional manner to help guide light propagating along the axis of fiber 20. Cladding 29 may comprise pure $SiO_2$ glass with a refractive-index difference substantially equal to zero or include a refractive-index modifying dopant.

Optical fiber 20 may be manufactured by any known technique for depositing glass particulate to form an optical preform. Common approaches readily known in the field include vapor phase axial deposition (VAD), outside vapor deposition (OVD), and modified chemical vapor deposition (MCVD). Applicants prefer MCVD for the embodiments described herein.

The optical preform includes profile segments selected to provide the desired transmission characteristics for the drawn fiber.

The combined link 10 of fiber A and fiber B in FIG. 1 has local chromatic dispersion that is different from zero along the whole transmission band, preferably with absolute value of dispersion above 1 ps/nm/km over the whole band. The combined line also has a low total dispersion slope, a low total optical loss, high Raman efficiency and moderate backscattering of the link section where the Raman pump is launched into the optical path.

The asterisks* in Table 2 designate that the stated values were derived from computer simulations. Values for attenuation refer to an average from a mass production of fiber, rather than isolated quantities. Table 3 identifies the optical characteristics of an optical link such as 10 with combinations of optical fibers described in more detail below. These combinations provide comparative examples to the present invention.

TABLE 3

| Link | Dispersion (ps/nm-km) | Dispersion Slope (ps/nm²-km) | Attenuation (dB/km) |
|---|---|---|---|
| Fiber A1 only | 17 | 0.06 | 0.20 |
| Fibers A1 → B1 | 0 | 0.0 | 0.22 |
| Fiber A2 only | 4.1 | 0.08 | 0.21 |
| Fiber A3 only | 4.5 | 0.05 | 0.21 |
| Fiber A4 only | 8.0 | 0.06 | 0.21 |
| Fiber A5 only | −3.1 | 0.07 | 0.21 |
| Fiber A6 only | −3.5 | 0.11 | 0.21 |
| Fibers A6 → B5 | −3.3 | 0.09 | 0.21 |
| Fiber A7 only | −3.0 | 0.05 | 0.21 |
| Fiber A8 only | −3.2 | 0.08 | 0.21 |
| Fibers A8 → B6 | −3.1 | 0.065 | 0.21 |

Table 4 lists optical characteristics of combinations of optical fibers A and B in accordance with the present invention and are described in more detail below.

TABLE 4

| Link | Dispersion (ps/nm-km) | Dispersion Slope (ps/nm²-km) | Attenuation (dB/km) |
|---|---|---|---|
| Fibers A1 → B2 | 10 | 0.045 | 0.205 |
| Fibers A1 → B3 | 0 | 0.04 | 0.215 |
| Fibers A2 → B2 | 4 | 0.055 | 0.21 |
| Fibers A3 → B2 | 4.3 | 0.04 | 0.21 |
| Fibers A4 → B2 | 6 | 0.045 | 0.21 |
| Fibers A4 → B4 | 0 | 0.04 | 0.215 |
| Fibers A5 → B7 | −3.1 | 0.05 | 0.21 |
| Fibers A6 → B8 | −3.5 | 0.07 | 0.21 |
| Fibers A8 → B7 | −3.2 | 0.055 | 0.21 |
| Fibers A7 → B9 | −3.3 | 0.04 | 0.21 |
| Fibers A8 → B10 | −3.3 | 0.05 | 0.21 |
| Fibers A9 → B11 | −3.5 | 0.035 | 0.21 |
| Fibers A10 → B12 | −4.3 | 0.033 | 0.21 |

EXAMPLE 1

As a first comparative example referring to Tables 1–4, an optical link is formed of Fiber A1, which is a conventional single-mode fiber according to ITU-T Rec. G652. Alternatively, Fiber A1 could be a Pure Silica Core fiber, which has in general a higher positive dispersion. Tables 1 and 3 list the optical performance of Fiber A1 when used as the sole fiber in the link. This standard single-mode fiber provides very high total dispersion that requires strong dispersion compensation. Also, this fiber has low Raman efficiency, which precludes distributed amplification.

Alternatively, Fiber A1 may be coupled with Fiber B1, which has an equal but opposite value of dispersion and dispersion slope. As shown in Table 3, the combination of these fibers A1 and B1 provides dispersion compensation within the link and a total slope along the link of about 0 ps/nm²/km. However, to attain the high negative dispersion slope in Fiber B1, high fluorine content must be used, which leads to high splice loss and high bending sensitivity for Fiber B1 (especially in the L-band) and overall difficulty in controlling dispersion and dispersion slope industrially. Moreover, in case of distributed Raman amplification, the structure of Fiber B1 necessary to achieve the stated optical characteristics leads to high scattering loss that will deplete both the signal and the pump and will cause high levels of noise due to single and double backscattering.

In contrast, the advantage of the present invention can be seen through the combination of Fiber A1 with Fibers B2 or B3. Table 4 lists the optical characteristics of these combined fibers. Fiber B3 has similar dispersion and effective areas as Fiber B1, but a different dispersion slope. Given that Fiber B1 has a negative dispersion slope and Fiber B3 has a positive slope, one of ordinary skill in the art will appreciate that Fiber B1 has a greater fluorine content than Fiber B3. Comparatively, Fiber B1 will have higher scattering and higher noise than Fiber B3.

The link with Fibers A1 with Fibers B2 or B3, despite a non-zero total dispersion slope, provides only moderate scattering loss of the second span fiber but with a high Raman efficiency. Therefore, the second span fiber may be pumped to attain Raman amplification. Due to a moderate content of fluorine of the type B fiber, the fibers in the link have a moderate splice loss. The combination of Fiber A1 with Fiber B2 has moderate total dispersion and slope/dispersion ratio at about 0.004 nm$^{-1}$, that can be easily compensated with separate dispersion compensating modules. The use of Fiber B3 provides dispersion compensation within the line and gives a low total dispersion slope. Consequently, the combination of a standard single-mode fiber span with a span of Fiber B2 or B3 can enable Raman amplification in the second span and permit efficient transmission of WDM channels across long distances.

EXAMPLE 2

A second example for the present invention is a multi-fiber link with a first span of non-zero positive dispersion fiber. Table 1 lists optical characteristics of such conventional fibers as Fibers A2–A4. Examples of Fiber A2 are Corning LEAF™ and Pirelli FreeLight™ fibers. An example of Fiber A3 is Lucent TrueWave® RS fiber, and an example of Fiber A4 is Alcatel TeraLight™ fiber. When any of these fibers is used alone in a link, the link has a relatively high dispersion slope and low Raman efficiency.

In contrast, the use of one of Fibers B2 or B4 as a second span in the link helps to achieve desirable results consistent with the present invention. Table 4 shows the optical characteristics achieved by combining these fibers. The values in Table 4 are for the link alone (assuming a span length ratio of 1:1) and do not take into account the contribution of dispersion compensating modules upstream or downstream of the link. In general, the combined link can provide high Raman efficiency with moderate noise from single and double backscattering, together with moderate dispersion and dispersion slope ratio for easy compensation with separate dispersion compensating modules. Also, the link having one of Fibers A2–A4 coupled with Fibers B2 or B4 will have moderate splice loss.

Figure 3:
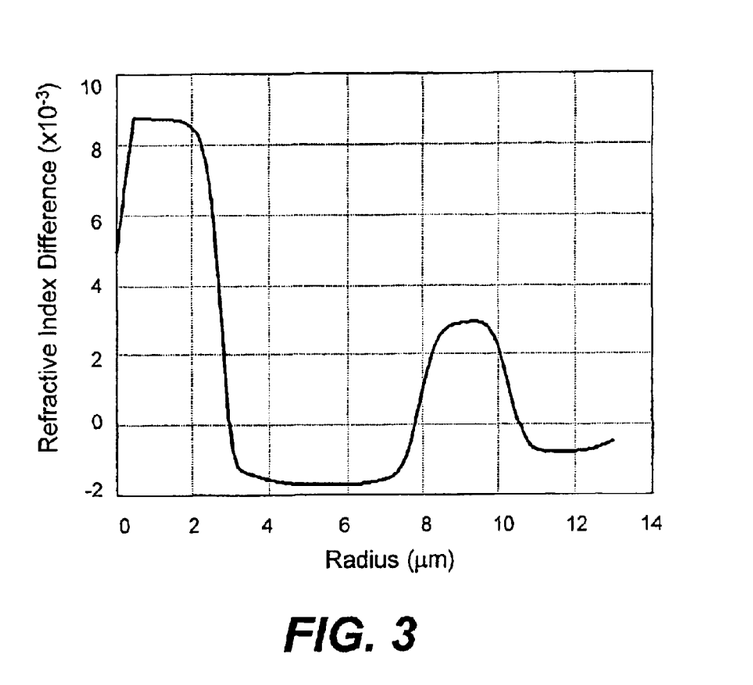
FIG. 3 is a refractive-index profile of the radius of the optical fiber in FIG. 2 according to one embodiment of the present invention.

FIG. 3 shows the refractive-index profile of one example of an optical fiber 20 consistent with the present invention that has positive dispersion characteristics, a low dispersion slope, low effective area, and low bending loss. Such a fiber resembles Fiber B2. Throughout the present description radii and widths are defined in terms of the sigma's of the Gaussian curves adopted for the modeling of the index profile. The model used for the refractive index profile distribution of this and the other examples is a superposition of gaussian-like curves, according to the following formula:

$$\Delta n(r) = \Delta n_1 * \exp\left(-\frac{1}{2}\left|\frac{r}{\sigma_1}\right|^{g1}\right) +$$

$$\Delta n_2 * \exp\left(-\frac{1}{2}\left|\frac{r - r_{dep}}{\sigma_2}\right|^{g2}\right) + +\Delta n_3 * \exp\left(-\frac{1}{2}\left|\frac{r - r_{out}}{\sigma_3}\right|^{g3}\right) +$$

$$\Delta n_4 * \exp\left(-\frac{1}{2}\left|\frac{r - r_{outdep}}{\sigma_4}\right|^{g4}\right)$$

where $\Delta n_i$ are maximum refractive-index differences of the respective segments, $\sigma_i$ are the radii or widths of the respective segments and:

g1=12
g2=3
g3=4
g4=4

$r_{dep}$=1.15*($\sigma_1$+$\sigma_2$)

$r_{out}$=$r_{dep}$+1.15*$\sigma_2$+1.1*$\sigma_3$ $r_{outdep}$=$r_{out}$+1.15*$\sigma_3$+1.1*$\sigma_4$ As shown in FIG. 3, inner core 22 has a maximum refractive-index difference $\Delta n_1$ of about 0.00875 and extends for a radius $r_1$ (i.e., $\sigma_1$) of about 2.6 μm before transitioning to the first layer 24. The refractive-index difference of inner core 22 may be established by doping the width of the inner core with $GeO_2$ or any other well-known refractive-index-increasing dopant. Although FIG. 3 depicts inner core 22 as having refractive index with a decreasing slope with radius, its profile may be have other geometries determined by the manufacturing process selected.

First glass layer 24 has depressed refractive-index difference $\Delta n_2$ at its peak of about –0.0017. Layer 24 has a sigma ($\sigma_2$) of about 2.11 µm, extending to a radial distance of about 7.8 µm to the start of adjacent layer 26. The refractive-index difference of first glass layer 24 may be depressed by doping the width of the first core layer with fluorine, or other known dopants, in a conventional fashion. First layer 24 is shown having a gaussian-like profile, but other geometries may be selected or attained for layer 24.

Second glass layer 26 surrounding layer 24 has a refractive-index difference greater than 0 and a value of $\Delta n_3$ at its maximum of about 0.003. Layer 26 has a sigma ($\sigma_3$) of around 1.09 µm, extending radially to about 10.6 µm where the refractive-index difference returns to 0. Second layer 26 is shown having a gaussian-like profile, but other geometries may be selected or attained for layer 26, for example it may comprise a tail with positive refractive-index difference in its radially external section.

Third glass layer 28 reaches a peak refractive index $\Delta n_4$ of about –0.00076 and has a sigma ($\sigma_4$) of about 1 µm. Third glass layer 28 is surrounded by cladding 29 that has a refractive-index difference of about 0 made of substantially pure silica.

The specific embodiment of fiber 20 illustrated in FIG. 3 has the following optical transmission characteristics, which have been generated through computer simulations:

LP11 theoretical cut-off=1270 nm

LP02 theoretical cut-off=1560 nm

In general, cable cut off according to ITU-T Rec. G650 is between about 200 to 400 nm less than the greatest of theoretical cut-off values.

Zero dispersion wavelength=1450 nm

Zero-dispersion slope=0.043 ps/nm²/km

Dispersion at 1550; 1625 nm=3.8; 5.9 ps/nm/km

Dispersion Slope at 1550; 1625 nm=0.031; 0.027 ps/nm²/km

Mode Field Diameter at 1450; 1550; 1625 nm=6.9; 7.4; 7.83 µm

Effective Area at 1450; 1550; 1625 nm=36.1; 41.2; 46.2 µm²

Non Linearity Coefficient γ at 1450; 1550; 1625 nm=2.87; 2.19; 1.76 $W^{-1}km^{-1}$ Macrobending attenuation at 1550; 1625 nm≦0.1; 0.5 dB for a loop of 32 mm diameter Microbending sensitivity at 1550; 1625 nm≦2; 4 (dB/km)/(g/mm).

Microbending sensitivity was determined by the expandable bobbin method, as described for example in G. Grasso and F. Meli "Microbending losses of cabled single-mode fibers," ECOC '88, page 526-ff., or in G. Grasso et al., "Microbending effects in single-mode optical cables," International Wire and Cable Symposium, 1988, page 722-ff.

EXAMPLE 3

A third example for the present invention is a multi-fiber link with a first fiber span of non-zero negative dispersion fiber. Table 1 lists optical characteristics of such fibers as Fibers A5–A10. An example of a fiber in this category is the Pirelli DeepLight™ fiber. With any of these fibers used alone, or with hybrid fibers formed from Fiber A6 and Fiber B5 and from Fiber A8 and Fiber B6 as shown in Table 3, the link will have a relatively high dispersion slope and low Raman efficiency, making it undesirable for Raman amplification. Most of these comparative examples have a zero dispersion wavelength below 1600 nm, which makes them unsuitable for transmitting WDM channels in the L-band. The example of Fiber A7 does not have a zero dispersion wavelength below 1600 nm, but still has low dispersion (about –1.0 ps/nm/km) at 1600 nm, which is unsuitable for dense WDM channels in the L-band.

A fiber developed by Applicants that can be advantageously used in an optical link adapted for the L-band is fiber A10.

Figure 10:
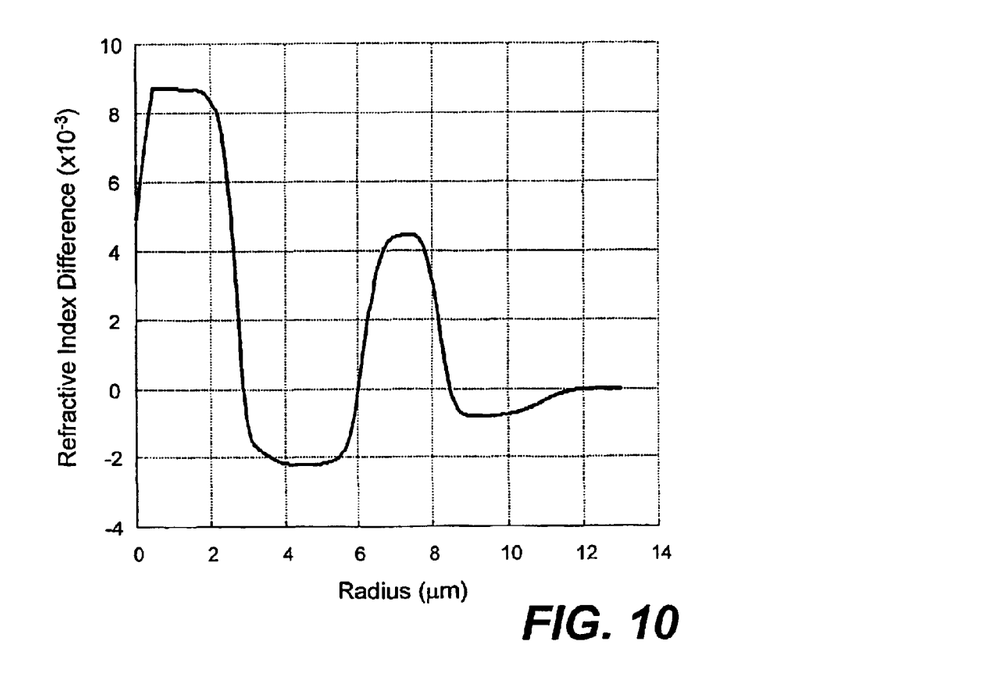
FIG. 10 is a refractive-index profile of the radius of optical fiber A10 as described in example 3.

FIG. 10 shows the refractive-index profile of an example of optical fiber A10. In this example, the inner core has a refractive index difference of about 0.0087 and a radius of about 2.56 µm. The first layer outside the inner core, which is doped with fluorine, has a negative refractive-index difference of about –0.0022 and a sigma of about 1.41 µm. The second layer is about 0.92 µm wide and has a refractive-index difference of 0.0045. Finally, the outer ring is slightly down-doped to yield a refractive-index difference of –0.0008 and has a sigma of about 1 µm. One of ordinary skill in the art will readily understand that numerous dopants may be used to raise the refractive index of the second layer, but $GeO_2$ is preferred. In this example, the next layer is essentially the cladding.

The specific embodiment of fiber A10 illustrated in FIG. 10 has the following optical transmission characteristics, which have been generated through computer simulations:

LP11 theoretical cut-off=1386 nm

LP02 theoretical cut-off=1494 nm

In general, cable cut off accordingly to G650 Rec. is between about 200 to 400 nm less than the greatest of theoretical cut off values.

Zero-dispersion slope=0.043 ps/nm²/km

Dispersion at 1450; 1550; 1625 nm=–8.5; –4.3; –0.4 ps/nm/km

Dispersion Slope at 1450; 1550; 1625 nm=0.038; 0.046; 0.058 ps/nm²/km

Mode Field Diameter at 1450; 1550; 1625 nm=7.2; 7.9; 8.5 µm

Effective Area at 1450; 1550; 1625 nm=39.2; 48.1; 57.0 µm²

Non Linearity Coefficient γ at 1450; 1550; 1625 nm=2.63; 1.87; 1.42 $W^{-1}km^{-1}$ Macrobending attenuation at 1550; 1625 nm≦0.2; 1.0 dB for a loop of 32 mm diameter Microbending sensitivity at 1550; 1625 nm≦4; 8 (dB/km)/(g/mm).

As anticipated above, fiber A10 has microbending, macrobending and non-zero dispersion characteristics in the L-band that make it specially advantageous for WDM transmissions in (or including) this band. In particular, this fiber has an absolute value of dispersion of about 2.3 ps/nm/km at a wavelength of 1600 nm. Applicants have determined that similar optical characteristics may be achieved, in general, by a fiber having a core refractive index profile comprising an inner core with a refractive index difference between about 0.008 and 0.012 and a radius (sigma) of between about 2.4 and 2.8 µm; a first layer outside the inner core, which is doped with fluorine, having a negative refractive-index difference of between about –0.0030 and –0.0020 and a sigma of between about 1.0 and 1.6 µm; a second layer being about 0.8 to 1.1 µm wide and having a refractive-index difference of between about 0.0030 and 0.0060. Finally, the fiber may comprise a down-doped outer ring.

Table 4 shows the improved optical performance attainable with a low effective area fiber having low dispersion slope such as Fibers B7–B12, which are listed in Table 2. These combinations shown in Table 4 provide a lower dispersion slope across the link, together with high Raman efficiency and moderate single and double backscattering. Also, such links exhibit moderate loss and moderate splice loss. In the preferred combination of Fiber A10 with Fiber B12, the link is particularly suitable for WDM transmission over the L-band because the absolute value of local dispersion is always above 1 ps/nm/km over the L-band. As well, such a link allows hyper-dense WDM transmission in the C-band due to a relatively high value of dispersion.

Figure 4:
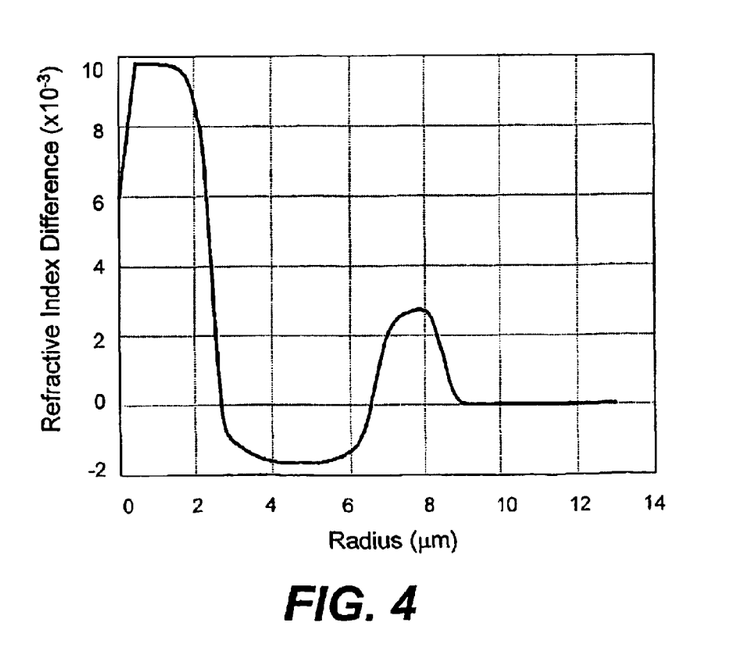
FIG. 4 is a refractive-index profile of the radius of the optical fiber in FIG. 2 according to a second embodiment of the present invention.

FIG. 4 shows the refractive-index profile of an example of an optical fiber 20 consistent with the present invention that has negative dispersion. The parameters of the refractive-index difference and radius of the glass layers 22, 24, 26, and 28 are shown in FIG. 4. In this example, the core has a peak refractive index difference of about 0.0098 and a radius of about 2.34 µm. The first layer outside the core, which is doped with fluorine, has a negative refractive-index difference of about −0.0017 and a sigma of about 1.722 µm. The second layer outside the core is about 0.8315 µm wide and has a refractive-index difference of 0.0028. One of ordinary skill in the art will readily understand that numerous dopants may be used to raise the refractive index of the second layer, but $GeO_2$ is preferred. In this embodiment, the next layer is essentially the cladding because it does not have dopants intended to change its refractive index from that of pure silica glass.

The specific embodiment of fiber 20 illustrated in FIG. 4 has the following optical transmission characteristics, which have been generated through computer simulations:

LP11 theoretical cut-off=1165 nm

LP02 theoretical cut-off=1492 nm

Dispersion at 1450; 1550; 1625 nm=−6.4; −3.1; −0.8 ps/nm/km

Dispersion Slope at 1450; 1550; 1625 nm=0.036; 0.030; 0.032 ps/nm²/km

Mode Field Diameter at 1450; 1550; 1625 nm=6.6; 7.2; 7.7 µm

Effective Area at 1450; 1550; 1625 nm=32.9; 38.7; 44.6 µm²

Non Linearity Coefficient γ at 1450; 1550; 1625 nm=3.18; 2.35; 1.84 $W^{-1}km^{-1}$ Macrobending attenuation at 1550; 1625 nm≦0.1; 1.0 dB for a loop of 32 mm diameter Microbending sensitivity at 1550; 1625 nm≦2; 4 (dB/km)/(g/mm).

Figure 5:
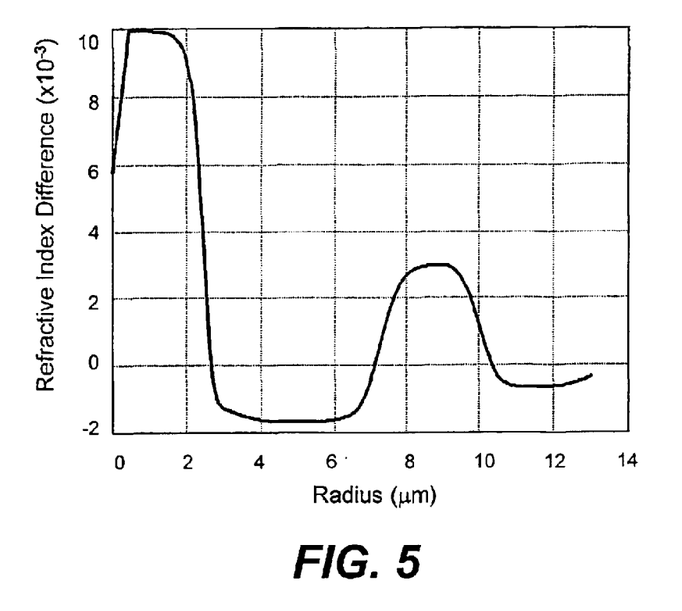
FIG. 5 is a refractive-index profile of the radius of the optical fiber in FIG. 2 according to a third embodiment of the present invention.

FIG. 5 shows the refractive-index profile of another example of an optical fiber 20 consistent with the present invention. The parameters of the refractive-index difference and radius of the glass layers 22, 24, 26, and 28 are shown in FIG. 5. This optical fiber has a core with three doped layers surrounding it. The core has a radius of about 2.36 µm and a maximum refractive-index difference of about 0.0099. The first layer, which is down-doped with fluorine or a similar dopant, has a peak refractive-index difference of about −0.0017 across a sigma of about 1.976. The second layer outside the core has a peak refractive-index difference of about 0.003 across a sigma of 1.25 µm. Finally, the outer ring is slightly down-doped to yield a refractive-index difference of −0.0007 and has a sigma ($\sigma_4$) of about 1 µm.

The specific embodiment of fiber 20 illustrated in FIG. 5 has the following optical transmission characteristics, which have been generated through computer simulations:

LP11 theoretical cut-off=1430 nm

LP02 theoretical cut-off=1657 nm

Dispersion at 1450; 1550; 1625 nm=−5.9; −3.5; −2.0 ps/nm/km

Dispersion Slope at 1450; 1550; 1625 nm=0.0310; 0.0204; 0.0206 ps/nm²/km

Mode Field Diameter at 1450; 1550; 1625 nm=6.6; 7.1; 7.6 µm

Effective Area at 1450; 1550; 1625 nm=32.4; 38.0; 43.8 µm²

Non Linearity Coefficient γ at 1450; 1550; 1625 nm=3.23; 2.40; 1.88 $W^{-1}km^{-1}$ Macrobending attenuation at 1550; 1625 nm≦0.1; 1.0 dB for a loop of 32 mm diameter Microbending sensitivity at 1550; 1625 nm≦2; 4 (dB/km)/(g/mm).

Figure 6:
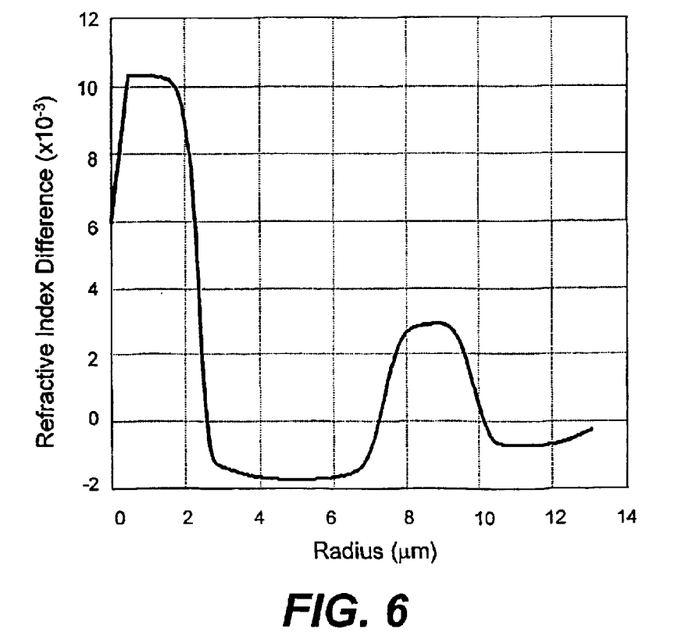
FIG. 6 is a refractive-index profile of the radius of the optical fiber in FIG. 2 according to a fourth embodiment of the present invention.

FIG. 6 shows the refractive-index profile of another example of an optical fiber 20 consistent with the present invention. The parameters of the refractive-index difference and radius of the glass layers 22, 24, 26, and 28 are shown in FIG. 6. This fiber, which resembles Fiber B2, has a core and three doped layers surrounding it. The peak refractive-index values are 0.0104, −0.0017, 0.003, and −0.0007, respectively. The core has a radius of about 2.27 µm, while the three surrounding layers are about 2.062 µm, 1.135 µm and 1 µm wide, respectively. This example is the preferred embodiment.

The specific embodiment of fiber 20 illustrated in FIG. 6 has the following optical transmission characteristics, which have been generated through computer simulations:

LP11 theoretical cut-off=1294 nm

LP02 theoretical cut-off=1576 nm

Dispersion at 1450; 1550; 1625 nm=−6.7; −4.2; −2.8 ps/nm/km

Dispersion Slope at 1450; 1550; 1625 nm=0.032; 0.020; 0.019 ps/nm²/km

Mode Field Diameter at 1450; 1550; 1625 nm=6.4; 6.9; 7.4 µm

Effective Area at 1450; 1550; 1625 nm=30.7; 36.0; 41.4 µm²

Non Linearity Coefficient γ at 1450; 1550; 1625 nm=3.42; 2.54; 1.996 $W^{-1}km^{-1}$ Macrobending attenuation at 1550; 1625 nm≦0.1; 1.0 dB for a loop of 32 mm diameter Microbending sensitivity at 1550; 1625 nm=≦2; 3 (dB/km)/(g/mm).

Figure 7:
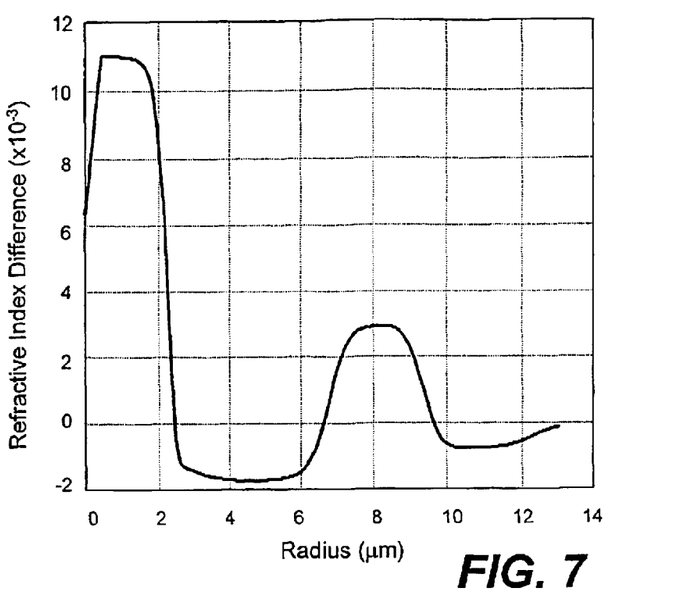
FIG. 7 is a refractive-index profile of the radius of the optical fiber in FIG. 2 according to a fifth embodiment of the present invention.

FIG. 7 shows the refractive-index profile of another example of an optical fiber 20 consistent with the present invention that has negative dispersion. The parameters of the refractive-index difference and radius of the glass layers 22, 24, 26, and 28 are shown in FIG. 7. In this embodiment, the fiber has a core with three surrounding doped layers. The core has a refractive-index difference of about 0.011, while the surrounding layers respectively have values of about −0.0017, 0.003, and −0.0007. The core has a radius of about 2.149 µm, while the next three surrounding layers have sigma's of about 1.849 µm, 1.20 µm and 1 µm, respectively.

The specific embodiment of fiber 20 illustrated in FIG. 7 has the following optical transmission characteristics, which have been generated through computer simulations:

LP11 theoretical cut-off=1319 nm

LP02 theoretical cut-off=1552 nm

Dispersion at 1450; 1550; 1625 nm=−11.4; −9.4; −7.8 ps/nm/km

Dispersion Slope at 1450; 1550; 1625 nm=0.0242; 0.0183; 0.0249 ps/nm$^2$/km

Mode Field Diameter at 1450; 1550; 1625 nm=6.27; 6.86; 7.39 $\mu$m

Effective Area at 1450; 1550; 1625 nm=29.5; 35.4; 41.5 $\mu$m$^2$

Non Linearity Coefficient γ at 1450; 1550; 1625 nm=3.58; 2.60; 2.00 W$^{-1}$km$^{-1}$ Macrobending attenuation at 1550; 1625 nm≦0.1; 1.0 dB for a loop of 32 mm diameter Microbending sensitivity at 1550; 1625 nm≦2; 4 (dB/km)/(g/mm).

Figure 8:
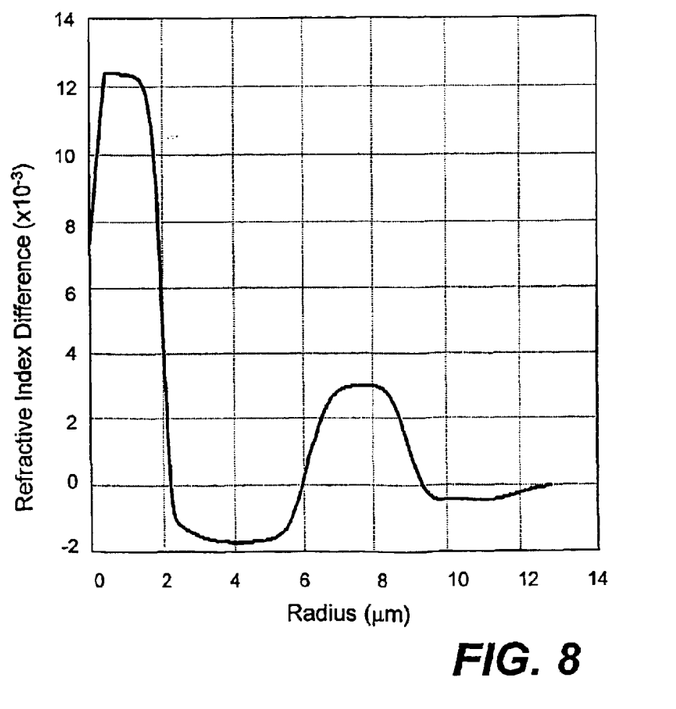
FIG. 8 is a refractive-index profile of the radius of the optical fiber in FIG. 2 according to a sixth embodiment of the present invention.

FIG. 8 shows the refractive-index profile of another example of an optical fiber 20 consistent with the present invention. The parameters of the refractive-index difference and radius of the glass layers 22, 24, 26, and 28 are shown in FIG. 8. As shown in FIG. 8, the fiber of this embodiment has a core with a refractive-index difference of about 0.0124 maximum across a radius of around 1.954 $\mu$m. The first layer surrounding the core is down-doped with a substance to yield a refractive-index difference of around −0.0017 across a sigma of about 1.714 $\mu$m. The final two layers have peak refractive-index differences of around 0.003 and −0.0005, respectively, sigma's of about 1.296 $\mu$m and about 1 $\mu$m, respectively.

The specific embodiment of fiber 20 illustrated in FIG. 8 has the following optical transmission characteristics, which have been generated through computer simulations:

LP11 theoretical cut-off=1453 nm

LP02 theoretical cut-off=1619 nm

Dispersion at 1450; 1550; 1625 nm=−19.2; −18.0; −16.2 ps/nm/km

Dispersion Slope at 1450; 1550; 1625 nm=0.012; 0.016; 0.036 ps/nm$^2$/km

Mode Field Diameter at 1450; 1550; 1625 nm=6.06; 6.72; 7.33 $\mu$m

Effective Area at 1450; 1550; 1625 nm=27.5; 34.2; 41.5 $\mu$m$^2$

Non Linearity Coefficient γ at 1450; 1550; 1625 nm=3.88; 2.72; 2.02 W$^{-1}$km$^{-1}$ Macrobending attenuation at 1550; 1625 nm≦0.1; 1.0 dB for a loop of 32 mm diameter Microbending sensitivity at 1550; 1625 nm≦2; 4 dB/km)/(g/mm).

Figure 9:
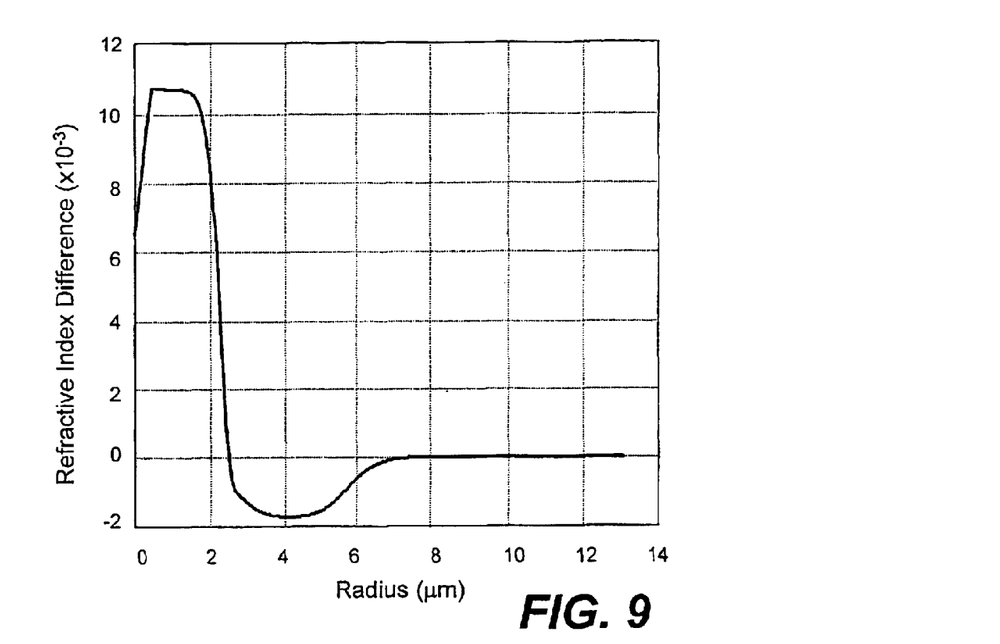
FIG. 9 is a refractive-index profile of the radius of the optical fiber in FIG. 2 according to a seventh embodiment of the present invention.

FIG. 9 shows the refractive-index profile of another example of an optical fiber 20 consistent with the present invention. The parameters of the refractive-index difference and radius of the glass layers 22, 24, 26, and 28 are shown in FIG. 9. The optical fiber of this embodiment is a "pure" W-profile without an outer positive or negative peak. In this fiber, the core is surrounded only by a trench of negative refractive index, followed by an extended region of pure silica. In particular, the core has a peak refractive-index difference of about 0.0107 across a radius of around 2.164 $\mu$m. The trench is about 1.448 $\mu$m wide with a peak refractive-index difference of about −0.0017.

The specific embodiment of fiber 20 illustrated in FIG. 9 has the following optical transmission characteristics, which have been generated through computer simulations:

LP11 theoretical cut-off=906.4 nm

LP02 theoretical cut-off=563.4 nm

Dispersion at 1450; 1550; 1625 nm=−7.19; −3.29; −0.78 ps/nm/km

Dispersion Slope at 1450; 1550; 1625 nm=0.043; 0.035; 0.032 ps/nm$^2$/km

Mode Field Diameter at 1450; 1550; 1625 nm=6.3; 6.8; 7.3 $\mu$m

Effective Area at 1450; 1550; 1625 nm=29.9; 34.9; 39.6 $\mu$m$^2$

Non Linearity Coefficient γ at 1450; 1550; 1625 nm=3.52; 2.63; 2.09 W$^{-1}$km$^{-1}$ Macrobending attenuation at 1550; 1625 nm≦0.5; 1.0 dB for a loop of 32 mm diameter Microbending sensitivity at 1550; 1625 nm≦1; 3 (dB/km)/(g/mm).

The design of fiber B limits detrimental effects typically associated with Raman pumping such as single or double backscattering. As well, moderate scattering is obtained in the second span fiber by limiting the amount of down-dopants, such as fluorine or the like. As a result, a refractive-index profile of fiber B is characterized by moderate refractive-index gaps between adjacent layers, thus reducing scattering. Scattering can be further decreased by reducing the steepness of index discontinuities between adjacent layers. For example, step-like discontinuities may be substituted by graded-index sections, to provide a smooth connection between adjacent profile segments. In a preferred embodiment, the refractive-index profile of fiber B also has a moderate concentration of an up-dopant, such as GeO$_2$ or the like. This solution corresponds to a chromatic dispersion at 1550 nm above about −8 ps/nm/km and further reduces scattering and accumulated dispersion. Moreover, the limited deepness of the depressed index layer in the refractive-index profile helps to reduce the criticality of industrial control of refractive-index parameters, such as inner core radius. This solution is thus industrially advantageous because it mitigates requirements on industrial tolerances. Finally, the invention gives a moderate total link attenuation, due to the fact that the second span fiber has a moderate attenuation coefficient and that the splice loss is limited, when the second span fiber is spliced to a first span fiber chosen between those commonly used for optical transmission.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. An optical fiber transmission link, comprising:

a first optical fiber having a first effective area greater than about 45 $\mu$m$^2$; and a second fiber coupled downstream from the first optical fiber, having a second effective area less than the first optical fiber, an absolute value of dispersion between about 2 and 20 ps/nm/km at 1550 nm, an absolute value of dispersion slope less than about 0.040 ps/nm$^2$/km at 1550 nm, and an attenuation coefficient at 1550 nm of less than about 0.24 dB/km and at 1450 nm of less than about 0.30 dB/km.

2. The optical fiber transmission link of claim 1, further comprising:
a pump source coupled to provide a pump light through the second optical fiber.

3. The optical fiber transmission link of claim 2, wherein the pump source couples the pump light into the link after the second optical fiber.

4. The optical fiber transmission link of claim 2, wherein the pump source couples the pump light into the link before the second optical fiber.

5. The optical fiber transmission link of claim 1, wherein the dispersion of the second optical fiber at 1550 nm is between about −2 and −20 ps/km/nm.

6. The optical fiber transmission link of claim 5, wherein the dispersion of the second optical fiber at 1550 nm is between about −3 and −8 ps/km/nm.

7. The optical fiber transmission link of claim 6, wherein the dispersion of the second optical fiber at 1625 nm is less than or equal to about −0.1 ps/km/nm.

8. The optical fiber transmission link of claim 1, wherein the second optical fiber has a macrobending attenuation for 1 loop over 32 mm mandrel less than about 0.5 dB at 1550 nm and less than about 1.0 dB at 1625 nm.

9. The optical fiber transmission link of claim 1, wherein the second fiber has a mode field diameter at 1550 nm less than 7.6 $\mu$m.

10. The optical fiber transmission link of claim 1, wherein the second fiber has a cable cut off wavelength between about 1250 and 1450 nm.

11. The optical fiber transmission link of claim 1, wherein the first optical fiber is a non-zero positive dispersion fiber.

12. The optical fiber transmission link of claim 1, wherein the first optical fiber is a non-zero negative dispersion fiber.

13. A method for transmitting a plurality of wavelength division multiplexed optical signals across a long distance, comprising:
transmitting the optical signals along a first optical fiber having a first effective area greater than about 45 $\mu m^2$;
transmitting the signals along a second fiber having a second effective area less than the first optical fiber, an absolute value of dispersion between about 2 and 20 ps/nm/km at 1550 nm, an absolute value of dispersion slope less than about 0.040 ps/nm$^2$/km at 1550 nm, and an attenuation coefficient at 1550 nm of less than about 0.24 dB/km and at 1450 nm of less than about 0.30 dB/km;
coupling a pump light into the second fiber so as to provide distributed Raman amplification of said optical signals.

14. An optical fiber for improved Raman amplification and transmission of wavelengths including the C-band, comprising:
a glass core including:
an inner core having a first refractive-index difference $\Delta n_1$ between about 0.008 and 0.014 and;
a first layer radially surrounding the inner core along the length of the fiber and having a second refractive-index difference $\Delta n_2$ of between about −0.0005 and −0.0030, and
a glass cladding surrounding the glass core and having a refractive-index difference $\Delta n_{CL}$ substantially equal to 0;
wherein the fiber has a mode field diameter at 1550 nm of less than about 7.6 $\mu$m, an attenuation coefficient at 1550 nm of less than about 0.24 dB/km and at 1450 nm of less than about 0.30 dB/km, absolute value of dispersion at 1550 nm between about 2 and 20 ps/nm/km, and absolute value of dispersion slope at 1550 nm of less than about 0.040 ps/nm$^2$/km.

15. The optical fiber of claim 14, wherein $\Delta n_1$ is between about 0.009 and 0.012.

16. The optical fiber of claim 14, wherein $\Delta n_2$ is between about −0.0010 and −0.0025.

17. The optical fiber of claim 14, further comprising a second layer radially surrounding the first layer along the length of the fiber and having a third refractive-index difference $\Delta n_3$ greater than 0.

18. The optical fiber of claim 17, wherein $\Delta n_3$ is lower than about 0.006.

19. The optical fiber of claim 17, further comprising a third layer radially surrounding the second layer along the length of the fiber and having a fourth refractive-index difference $\Delta n_4$ lower than 0.

20. An optical fiber preform for drawing an optical fiber for improved Raman amplification and transmission of wavelengths including the C-band, the preform comprising:
a glass core including:
an inner core having a first width and a first refractive-index difference $\Delta n_1$ between about 0.008 and 0.014 and;
a first layer radially surrounding the inner core along the length of the fiber and having a second width and a second refractive-index difference $\Delta n_2$ of between about −0.0005 and −0.0030, and
a glass cladding surrounding the glass core and having a third width and a refractive-index difference $\Delta n_{CL}$ substantially equal to 0;
wherein the core is selected so that the drawn fiber has a mode field diameter at 1550 nm of less than about 7.6 $\mu$m, an attenuation coefficient at 1550 nm of less than about 0.24 dB/km and at 1450 nm of less than about 0.30 dB/km, absolute value of dispersion at 1550 nm between about 2 and 20 ps/nm/km, and absolute value of dispersion slope at 1550 nm of less than about 0.040 ps/nm$^2$/km.

* * * * *